METHOD OF AND DEVICE FOR PNEUMATIC MALTING
Filed Aug. 8, 1955 2 Sheets-Sheet 1
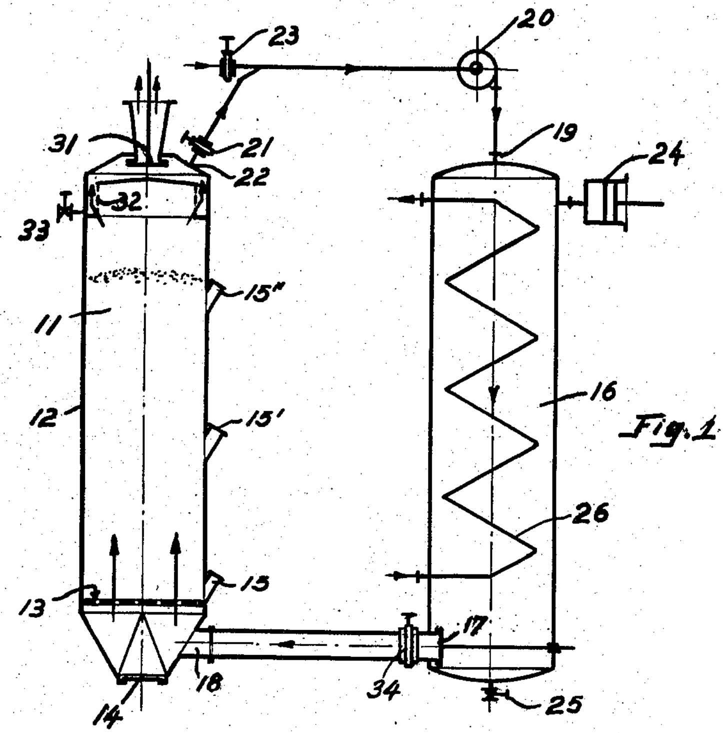
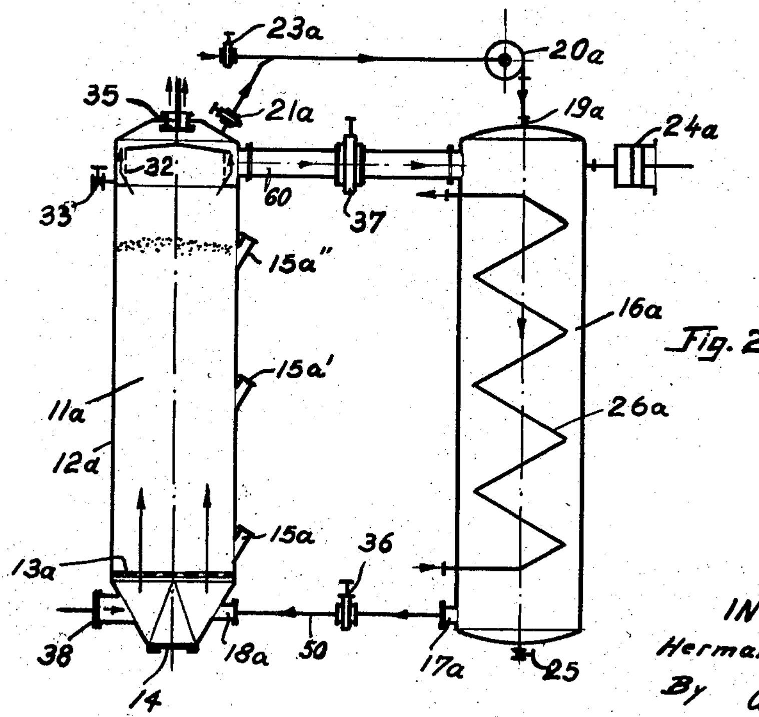
INVENTOR:
Hermann Georg Popp
By Walter Becker
Patent Agent METHOD OF AND DEVICE FOR PNEUMATIC MALTING
Filed Aug. 8, 1955 2 Sheets-Sheet 2
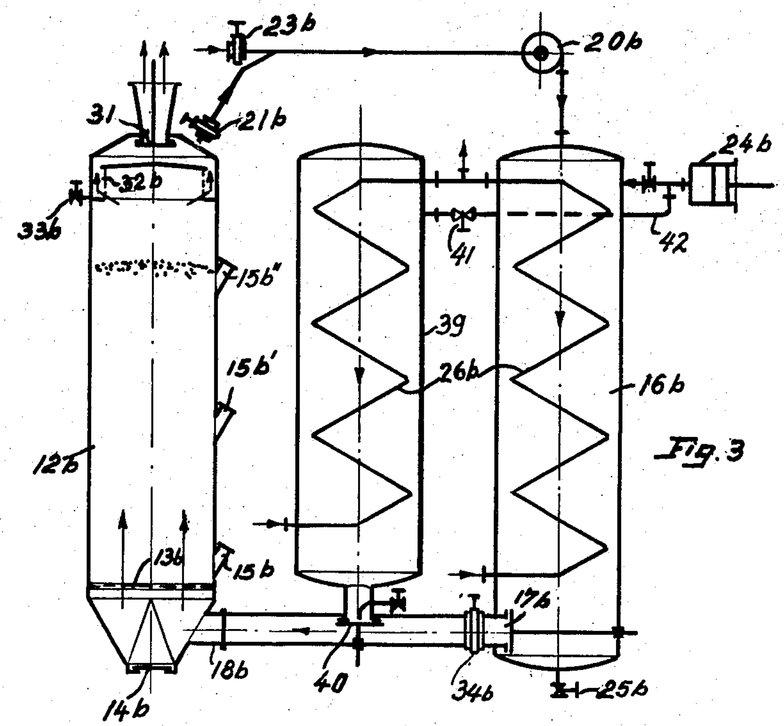
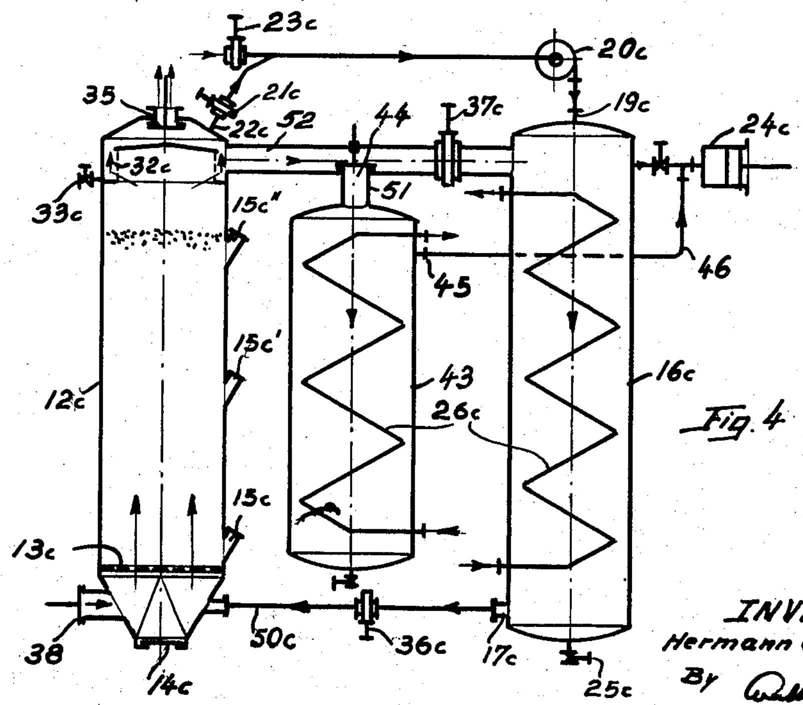
INVENTOR:
Hermann Georg Popp
By [signature]
Patent Agent.

United States Patent Office 2,891,892

Patented June 23, 1959

2,891,892

METHOD OF AND DEVICE FOR PNEUMATIC MALTING

Hermann Georg Popp, Santiago, Chile

Application August 8, 1955, Serial No. 527,071

7 Claims. (Cl. 195—71)

The present invention relates to malting and, more specifically, to a method of and device for pneumatic malting.

Green malt is produced in pneumatic malting installations in germination compartments or vessels or in germination drums. The maximum output with such systems is approximately 300 kilograms per square meter of support area. The employment of germination compartments, however, has the disadvantage over germination drums that when the material is being turned, the rootlets or sprouts are apt to be shorn off. Furthermore, the employment of either system i.e. germination compartments or germination drums necessitates a considerable expenditure of labor for emptying the same. Furthermore, the load on the support area as compared with the carbonic acid static process with about 500 kilograms per square meter is unsuitable for an enrichment of the air with carbonic acid so that the malting loss can be improved only slightly. The $CO_2$ process also has the disadvantage that the material has twice to be couched or pulled into heaps.

It is, therefore, an object of the present invention to provide a pneumatic malting process which will overcome the above mentioned drawbacks.

It is also an object of this invention to provide a malting process which will not only simplify the process as such but will considerably reduce the malting losses heretofore encountered.

It is a still further object of this invention to provide an improved malting installation, which will be considerably simpler and more efficient than similar installations heretofore used for pneumatic malting.

These and other objects and advantages of the invention will appear more clearly from the following specification in connection with the accompanying drawings, in which:

Fig. 1 diagrammatically illustrates an installation according to the invention for turning the material with or without pressure.

Fig. 2 diagrammatically illustrates a modification according to the invention, in conformity with which the turning of the material is effected under vacuum.

Fig. 3 shows a diagrammatic representation of an installation according to the invention comprising a pressure reservoir for turning the material by pressure.

Fig. 4 diagrammatically illustrates an installation according to the invention, which includes a vacuum reservoir for turning by vacuum.

According to the present invention, the material, which can be piled up several meters high in germination compartments, is subjected to a sudden pressure balance throughout the material and between the various accumulated pressure drops therein. This sudden pressure balance or equalization of pressure which is higher than that required for mere aeration of the material suddenly causes the material to be thrown upwardly whereby it is turned. The term "turned" implies more of a loosening of the germination material. According to the invention, the turning can be initiated by means of pressure or by a vacuum. Inasmuch as for this turning, no additional apparatus or installation is necessary within the germination compartments, the material is treated in such a manner that it is safeguarded to a maximum extent against injury. The occurring higher air resistance is made up to a considerable extent by the shorter air distance and by the fact that the customary excess pressure in the germination compartment of from 10 to 15 millimeters of water has been eliminated. A further reduction is obtained by the fact that the air has a higher $CO_2$ content which in turn brings about a reduction in respiration associated with lower heat production. As a result thereof, smaller amounts of air will suffice. Even with a multiplied output per square meter of support as compared with other germination apparatus, the germination process can still be carried out economically and in a proper manner. If, however, an excessively high output is selected, it is expedient to effect the pneumatic turning at constant pressure and to maintain said pressure by a compressor thereby increasing the density of the air and thus the heat absorption. The quantity of air can then for the same heat absorption be reduced in proportion to the increase in pressure which in turn brings about a reduction in the air resistance and thus yields an economical process. Air under pressure absorbs the less water the higher the pressure is selected whereby the danger of drying out is further reduced. Since the germination compartments and cooling towers can be constructed of reinforced concrete, no special construction is necessary if a good insulation is provided. In such an instance the installation costs are particularly low so that the system according to the invention is highly economical even for smallest installations.

The cooling of the air can be effected in cooling towers by direct injection of cold water or, if desired, the cooling may be effected indirectly by cooling coils. Inasmuch as a portion of the carbonic acid will be bound by the cooling water, cooling coils would be preferable.

In each of the figures a single compartment or vessel only is shown for the sake of clarity. The four embodiments shown in the drawings have certain structural features in common which will be described first before dealing with the individually distinctive features of the various embodiments. The actual number of compartments or vessels in a practical installation is obviously a matter of choice or design depending upon local conditions and requirements.

The material to be germinated designated by the reference numeral 11 is charged into a vessel 12. Each vessel 12 has a perforated bottom 13 on which the material is supported, an outlet shut-off valve 14 at its base below the perforated bottom 13, and a number of test access passages 15, 15', 15" disposed at various levels between the perforated bottom or support 13 and the level of maximum height up to which the material is stacked in the vessel.

The arrangement furthermore comprises an air cooling tower 16 provided with an outlet 17 near its lower end. The outlet 17 is connected to an inlet 18 beneath the perforated bottom 13 of the vessel 12. The cooling tower 16 is furthermore provided with an inlet 19 at its upper end. The inlet 19 is connected by way of a blower 20 and control slide valve 21 to an outlet 22 at the top of the vessel 12. An air inlet slide valve 23 is connected to the conduit leading from the valve 21 to the blower 20. A pump 24 is arranged near the top of the cooling tower 16 and is connected thereto, while a valve 25 for drawing off the condensate is arranged at the base of and connected to the tower 16. Finally the cooling tower 16 has arranged therein cooling coils 26.

The installation of Fig. 1 furthermore includes a remotely controlled valve 31 at the top of the vessel 12, a deflector screen 32 arranged in the space between the valve 31 and the maximum loading level for preventing the material from being blown out during the turning operation, and a valve 33 for drawing off the condensate. The valve 33 is arranged at about the height of the lower edge of the deflector 32. A valve 34 adapted when opened to release pressure from the tower 16 into the vessel 12 is associated with the outlet connection 17 at the lower end of the cooling tower.

The installation shown in Fig. 2 comprises a valve 35 arranged at the top of the vessel 12*a*, which latter also has a deflector 32*a* and a valve 33*a* for drawing off condensate similar to the valve 33 in Fig. 1. The cooling tower outlet 17*a* and the vessel inlet 18*a* are connected with each other by a conduit 50 which latter has mounted therein a valve 36 for selectively releasing pressure from the tower 16*a* into the vessel 12*a*. The installation comprises an additional connection 60 and between the upper portions of the vessel 12*a* and of the cooling tower 16*a* which connection is controlled by a valve 37. The vessel 12*a* is, furthermore, provided with an additional lower outlet connection beneath its perforated bottom 13*a* which outlet connection comprises a valve 38 adapted when opened suddenly to admit atmospheric air into the vessel 12*a*. The material in the vessel 12*a* is designated with the reference numeral 11*a*. Other parts in Fig. 2 corresponding to those of Fig. 1 are designated with the same reference numerals as in Fig. 1 but with the additional character *a*.

Referring now to Fig. 3, the installation shown therein is generally similar to that of Fig. 1 but additionally includes a pressure reservoir 39 connected by way of a valve 40 to the connection between the outlet 17*b* of the cooling tower and the inlet 18*b* of the vessel 12*b*. The said valve 40 is adapted to effect sudden pressure release from the cooling tower 16*b* to the vessel 12*b*. The pressure reservoir 39 is furthermore connected to the pump 24*b* by means of a valve 41 and conduit 42.

The remaining parts of Fig. 3 and corresponding to those of Fig. 1 have been designated with the same reference numerals as in Fig. 1 but with the additional character *b*.

Fig. 4 illustrates an installation which is generally similar to that of Fig. 2 but in addition thereto includes a vacuum container 43. The vacuum container 43 is connected by means of a conduit 51 and a valve 44 therein with a conduit 52 arranged for connecting the upper end of vessel 12*c* through a valve 37*c* with the upper portion of the cooling tower 16*c*. The valve 44 is adapted when opened to admit air under pressure into the container 43. The vacuum container 43 is adapted to communicate with pump 24 through a valve 45 and a conduit 46.

The other parts of Fig. 4 corresponding to those of Fig. 2 are provided with the same reference numerals as the latter but instead of the affix *a*, the affix *c* is used.

The material to be malted may be piled up to a height of several meters or yards on the perforated bottom of each germination vessel. In an installation constructed in accordance with the invention, the material may be placed on support surfaces of relatively small area with a multiplied output per square meter as compared with other systems so that a direct discharge will be obtained. The amount of $CO_2$ produced as a result of the high layers in the air stream will also be better maintained which reduces waste. Outputs in the germination compartments according to the invention of up to 3000 kilograms per square meter of support area are obtainable. This implies, therefore, that for example with an output of 21 tons, a supporting surface of 7 square meters is required. By modifying an existing installation of any type to the germination compartment system of the invention, it is possible to obtain an increased output with the installation according to the invention, even if the areas of the support surfaces are left unchanged. The valve 23 controls the admission of air to the blower 20. When operating with fresh air only, the valve 31 of Fig. 1 and valve 31*b* of Fig. 3 or the air valve 35 of Fig. 2 and 35*c* of Fig. 4 and the valve 23, 23*b* are opened fully while the slide valve 21, 21*b* is closed. When partially closing or opening the said valves, fresh air and waste air will mix. When the valve 31, 31*b* and the valve 23, 23*b* are closed while the valve 21, 21*b* is opened, a true air recirculation takes place. In this instance depending on the requirements of economy, the installation can be operated with or without excess pressure. The cooling tower 16, 16*a*, 16*b*, 16*c* is suited to the requirements prevailing in the individual cases and is so dimensioned that the pressure applied at higher temperatures can still be released.

As has been explained above, the turning in the germination compartments or vessels 12, 12*a*, 12*b*, 12*c* is effected by means of a pressure or vacuum, the "turning" being understood to mean a loosening of the germination material. No system yields a complete turning and, indeed this is not necessary because the temperature differences between the air inlet and air outlet should amount to about 2.5° C. only. The turning under pressure can be initiated in various ways.

When the cooling tower 16, 16*c* (Figs. 1 and 3) alone is subjected to excess pressure, the valve 31, 31*c* is opened so that the germination vessel 12, 12*c* is subjected to atmospheric pressure. Turning is then affected by sudden opening of the valve 34 or by sudden opening of the valve 40 of the pressure reservoir 39 (Fig. 3). In accordance with the invention, both valves 34*c* and 40 could be opened at the same time. The excess pressure released from the cooling tower 16, 16*c* or from the pressure reservoir 39 (Fig. 3) drops gradually throughout the material down to atmospheric pressure.

In accordance with the arrangement of Figs. 1 and 3 of the present invention, the entire system may also be put under pressure, with one or both of the valves 34 and 40 open. Turning is then effected by suddenly opening the valve 31. Aside from the above, the procedure is as described in the preceding paragraph.

Turning under vacuum can be effected in accordance with the invention and in accordance with the installations shown in Figs. 2 and 4. To this end, the valve 35, 35*c* and the valve 17*a*, 17*c* is closed. If the entire system operates under vacuum, then the valves 37, 37*c* and 44 are opened. If the cooling tower 16 only is under vacuum, valve 37 is closed. If the cooling tower 16*a*, 16*c* and the reservoir or container 43 (Fig. 4) are under vacuum, the valves 37 and 44 are closed. If the valve or valves 38 and one of the two valves 37 and 44 are suddenly opened, turning will be effected by the equalization of pressure which takes place through the entire material. Naturally, also both valves 37 and 44 may be opened.

Simultaneously with the turning operation, the prevailing carbonic acid is discharged. If shortly prior to the completion of the germination process a further turning operation is effected, it is particularly easy to effect removal of the material. The transfer of the green malt to the kiln may be effected by any standard transporting means. The servicing of the installation including the discharging operation can easily be carried out by a single operator.

It is, of course, understood that the present invention is, by no means, limited to the particular arrangements shown in the drawings but also comprises any modifications within the scope of the appended claims.

What I claim is:

1. In a pneumatic malting process according to which the material to be germinated is piled up in a germination compartment, the step of: below the material in said germination compartment creating a pressure different from the pressure above the material in said compartment, and suddenly creating a pressure equalization throughout the material in said germination compartment between the pressures above and below the material in said germination compartment at such a speed as to cause said material temporarily to become airborne while displacing said material upwardly in said compartment, thereby imparting a turning effect upon said material.

2. In a pneumatic malting process according to which the material to be germinated is piled up in form of a column in a germination compartment, the step of: suddenly creating a pressure equalization between stored sub-atmospheric pressure at one end and a higher pressure at the other end of said column while effecting said pressure equalization through said column at such a speed as to displace said material upwardly in said compartment for imparting a turning effect upon said material.

3. A process according to claim 2, in which the higher pressure is substantially atmospheric.

4. In a pneumatic malting process according to which the material to be germinated is piled up in a germination compartment, the step of: creating an abnormally steep air pressure gradient between stored vacuum and a higher pressure extending upwardly throughout the material in said germination compartment to cause said material to become airborne and displaced upwardly in said compartment, thereby imparting a turning effect upon the material in said compartment.

5. A process according to claim 4, in which the higher pressure is substantially atmospheric.

6. In a pneumatic malting process according to which the material to be germinated is piled up in a germination compartment, the steps of: creating an abnormally steep air pressure gradient extending upwardly throughout the material in said germination compartment for causing said material temporarily to become airborne and displaced upwardly in said compartment, circulating attemperated air under pressure through said compartment and reducing the quantity of air in conformity with the increased heat absorption brought about by said circulating attemperated air.

7. In a pneumatic malting process according to which the material is piled up several yards high in a germination compartment so that a stronger carbonic acid collection occurs, the step of: turning the material in said compartment through sudden pressure equalization throughout the piled up material at a higher velocity than is necessary for the mere aeration of the material so that the material will be loosened in vertical direction with regard to the particles thereof.

References Cited in the file of this patent

UNITED STATES PATENTS

| | | |
|---|---|---|
| 672,843 | Renner | Apr. 23, 1901 |
| 683,362 | Weisenfeld | Sept. 24, 1901 |
| 1,390,341 | Cushing | Sept. 23, 1921 |
| 1,733,022 | Koon | Oct. 22, 1929 |
| 1,899,160 | Kusserow | Feb. 28, 1933 |
| 2,137,141 | Lindsey | Nov. 15, 1938 |